US008986878B2

(12) United States Patent
Guen et al.

(10) Patent No.: US 8,986,878 B2
(45) Date of Patent: Mar. 24, 2015

(54) RECHARGEABLE BATTERY INCLUDING A RESISTANCE MEMBER

(75) Inventors: Min-Hyung Guen, Yongin-si (KR);
Hyun-Soo Lee, Yongin-si (KR);
Yong-Chul Seo, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 231 days.

(21) Appl. No.: 13/565,506

(22) Filed: Aug. 2, 2012

(65) Prior Publication Data

US 2013/0252079 A1   Sep. 26, 2013

(30) Foreign Application Priority Data

Mar. 20, 2012  (KR) .................. 10-2012-0028361

(51) Int. Cl.
| H01M 2/06 | (2006.01) |
| H01M 2/30 | (2006.01) |
| H01M 2/04 | (2006.01) |
| H01M 10/04 | (2006.01) |
| H01M 2/26 | (2006.01) |
| H01M 10/0525 | (2010.01) |

(52) U.S. Cl.
CPC ............ *H01M 2/305* (2013.01); *H01M 2/0404* (2013.01); *H01M 2/043* (2013.01); *H01M 2/0473* (2013.01); *H01M 2/0486* (2013.01); *H01M 2/263* (2013.01); *H01M 10/0431* (2013.01); *H01M 10/0525* (2013.01); *Y02T 10/7011* (2013.01)
USPC ....................................... 429/179

(58) Field of Classification Search
USPC ........................ 429/175, 178–184
See application file for complete search history.

(56) References Cited

U.S. PATENT DOCUMENTS

| 6,737,192 | B2 * | 5/2004 | Yabuki et al. ................. 429/178 |
| 7,192,671 | B2 * | 3/2007 | Hashimoto et al. ............ 429/94 |
| 7,972,717 | B2 * | 7/2011 | Meguro et al. ................. 429/61 |

(Continued)

FOREIGN PATENT DOCUMENTS

| EP | 2 426 751 A1 | 3/2012 |
| EP | 2 461 393 A1 | 6/2012 |

(Continued)

OTHER PUBLICATIONS

EPO Search Report dated Apr. 16, 2013, for corresponding European Patent application 12186473.0, (5 pages).

*Primary Examiner* — Carlos Barcena
*Assistant Examiner* — Lilia V Nedialkova
(74) *Attorney, Agent, or Firm* — Christie, Parker & Hale, LLP (57) ABSTRACT

A rechargeable battery including: an electrode assembly including a first electrode, a second electrode, and a separator between the first and second electrodes; a case accommodating the electrode assembly; a cap plate covering an opening of the case; a first electrode terminal arranged on the cap plate, electrically connected to the cap plate, and connected to the first electrode; and a second electrode terminal arranged on the cap plate, insulated from the cap plate, and connected to the second electrode, the first electrode terminal including a terminal plate connected to the first electrode and exposed to an outside of the cap plate, and a top plate electrically connecting the terminal plate and the cap plate, and having an electrical resistance greater than an electrical resistance of the terminal plate.

12 Claims, 5 Drawing Sheets

(56) References Cited

U.S. PATENT DOCUMENTS

| | | | |
|---|---|---|---|
| 2005/0037212 A1* | 2/2005 | Budinski | 428/457 |
| 2011/0081572 A1* | 4/2011 | Byun et al. | 429/178 |
| 2011/0244310 A1* | 10/2011 | Kim | 429/158 |
| 2011/0305943 A1 | 12/2011 | Byun et al. | |
| 2012/0021277 A1 | 1/2012 | Byun et al. | |
| 2012/0052371 A1* | 3/2012 | Kim et al. | 429/179 |
| 2012/0141845 A1* | 6/2012 | Byun et al. | 429/61 |
| 2012/0156548 A1* | 6/2012 | Kim | 429/158 |
| 2012/0164522 A1* | 6/2012 | Kawamoto et al. | 429/179 |
| 2012/0183845 A1* | 7/2012 | Kawamoto et al. | 429/179 |
| 2012/0189908 A1* | 7/2012 | Tsutsumi et al. | 429/179 |
| 2012/0237817 A1* | 9/2012 | Kim | 429/158 |

FOREIGN PATENT DOCUMENTS

| | | |
|---|---|---|
| KR | 10-2001-0008566 | 2/2001 |
| KR | 10-2005-0088750 | 9/2005 |

* cited by examiner

RECHARGEABLE BATTERY INCLUDING A RESISTANCE MEMBER

CROSS-REFERENCE TO RELATED APPLICATION

This application claims priority to and the benefit of Korean Patent Application No. 10-2012-0028361, filed on Mar. 20, 2012 in the Korean Intellectual Property Office, the entire content of which is incorporated herein by reference.

BACKGROUND

1. Field

Aspects of embodiments of the present invention relate to a rechargeable battery.

2. Description of the Related Art

A rechargeable battery can be repeatedly charged and discharged, unlike a primary battery that cannot be recharged. A low-capacity rechargeable battery is used for small portable electronic devices, such as mobile phones, laptop computers, and camcorders. A large-capacity rechargeable battery is used as a power source for driving motors, such as for electric vehicles and hybrid vehicles.

The rechargeable battery may include an electrode assembly having a positive electrode and a negative electrode provided on both sides of a separator, a case accommodating the electrode assembly, a cap plate sealing an opening of the case, and an electrode terminal penetrating the cap plate and electrically connected to the electrode assembly.

When a conductive material penetrates the case of the rechargeable battery to pierce the electrode assembly, the high-voltage current flowing through the electrode terminal flows again toward the electrode assembly through the cap plate, the case, and the conductive material. If the amount of high-voltage current is large, the electrode assembly may be ignited or exploded.

The above information disclosed in this Background section is only for enhancement of understanding of the background of the described technology and therefore it may contain information that does not form the prior art that is already known in this country to a person of ordinary skill in the art.

SUMMARY

According to an aspect of the present invention, a rechargeable battery controls the amount of high-voltage current flowing toward a cap plate through an electrode terminal upon penetration of a conductive material.

According to an embodiment of the present invention, a rechargeable battery includes: an electrode assembly including a first electrode, a second electrode, and a separator between the first and second electrodes; a case accommodating the electrode assembly; a cap plate covering an opening of the case; a first electrode terminal arranged on the cap plate, electrically connected to the cap plate, and connected to the first electrode; and a second electrode terminal arranged on the cap plate, insulated from the cap plate, and connected to the second electrode, the first electrode terminal including a terminal plate connected to the first electrode and exposed to an outside of the cap plate, and a top plate electrically connecting the terminal plate and the cap plate, and having an electrical resistance greater than an electrical resistance of the terminal plate.

The cap plate may include: a main body portion corresponding to the opening of the case; a contact portion facing the first electrode terminal and surrounded by a through hole formed in the main body portion, the contact portion being in contact with the top plate; and a connecting portion connecting the contact portion and the main body portion.

The contact portion may have an area corresponding to an area of the top plate.

The cap plate and the terminal plate may be formed of aluminum, and the top plate may be formed of stainless steel.

The contact portion may have a substantially rectangular shape corresponding to a substantially rectangular shape of the top plate, and the connecting portion may connect at least one side of the contact portion and the main body portion.

The connecting portion may have a width smaller than a width of the at least one side of the contact portion.

The connecting portion may include two parts arranged symmetrically with respect to the contact portion.

The first electrode terminal may further include a column portion connected to the terminal plate and extending to an inside of the cap plate through the through hole.

The column portion may include a first column and a second column that are inserted in the through hole at opposite sides of the top plate.

The first column may be connected to a lead tab of the electrode assembly by welding.

The rechargeable battery may further include: a first insulator electrically insulating the first electrode terminal and the cap plate, and the first insulator may be formed integrally by insert molding with the first and second columns disposed at an outer periphery of the top plate, the terminal plate covering the top plate, and a corresponding portion of the cap plate corresponding to the terminal plate.

The second electrode terminal may include: a terminal plate connected to the second electrode and exposed to the outside of the cap plate; and a column portion connected to the terminal plate and extending to an inside of the cap plate through a through hole formed in the cap plate, and the column portion may be connected to a lead tab of the electrode assembly.

The rechargeable battery may further includes a second insulator electrically insulating the second electrode terminal and the cap plate, and the second insulator may be formed integrally by insert molding with the terminal plate of the second electrode terminal, the column portion of the second electrode terminal, and a corresponding portion of the cap plate corresponding to the terminal plate of the second electrode terminal.

According to an aspect of embodiments of the present invention, a rechargeable battery is configured to control the amount of high-voltage current flowing toward the cap plate through the terminal plate and the top plate upon penetration of a conductive material by electrically connecting the terminal plate and cap plate of the first electrode terminal and forming the top plate having a higher resistance value than the terminal plate at the electrical connection. Accordingly, ignition or explosion of the electrode assembly can be prevented or substantially prevented. As such, a rechargeable battery according to embodiments of the present invention is suited for application in an electric vehicle or a hybrid electric vehicle.

BRIEF DESCRIPTION OF THE DRAWINGS

The accompanying drawings, together with the specification, illustrate some exemplary embodiments of the present invention, and, together with the description, serve to explain aspects and principles of the present invention.

| Description of Reference Numerals Indicating Some Elements in the Drawings | |
| --- | --- |
| 10: electrode assembly | 11: first electrode |
| 11a, 12a: coated regions | 11b, 12b: uncoated regions |
| 12: second electrode | 13: separator |
| 20: case | 21: opening |
| 30: cap plate | 31: electrolyte injection port |
| 32: vent hole | 33: sealing plug |
| 34: vent plate | 34a: notch |
| 35, 36: corresponding portions | 41: first electrode terminal |
| 42: second electrode terminal | 43, 44: first and second lead tabs |
| 61, 62: first and second insulators | 131, 132: first and second columns |
| 311: main body portion | 312: contact portion |
| 313: connecting portion | 411: terminal plate |
| 412: top plate | 413: column portion |
| H1, H2: through holes | P: path of current |
| W1, W2: widths | |

DETAILED DESCRIPTION

The present invention is described more fully hereinafter with reference to the accompanying drawings, in which some exemplary embodiments of the invention are shown and described. However, as those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
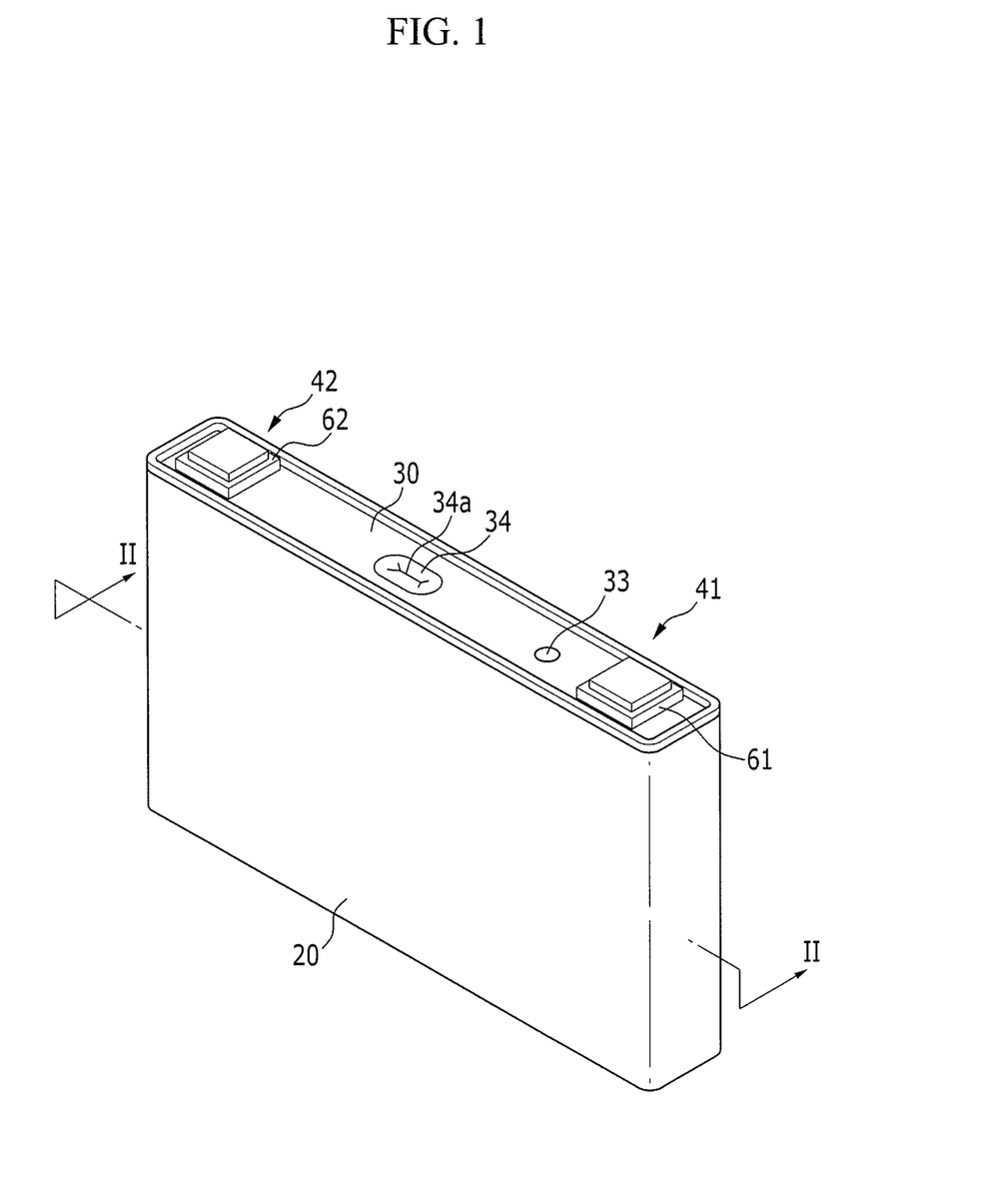
FIG. 1 is a perspective view of a rechargeable battery according to an exemplary embodiment of the present invention.
Figure 2:
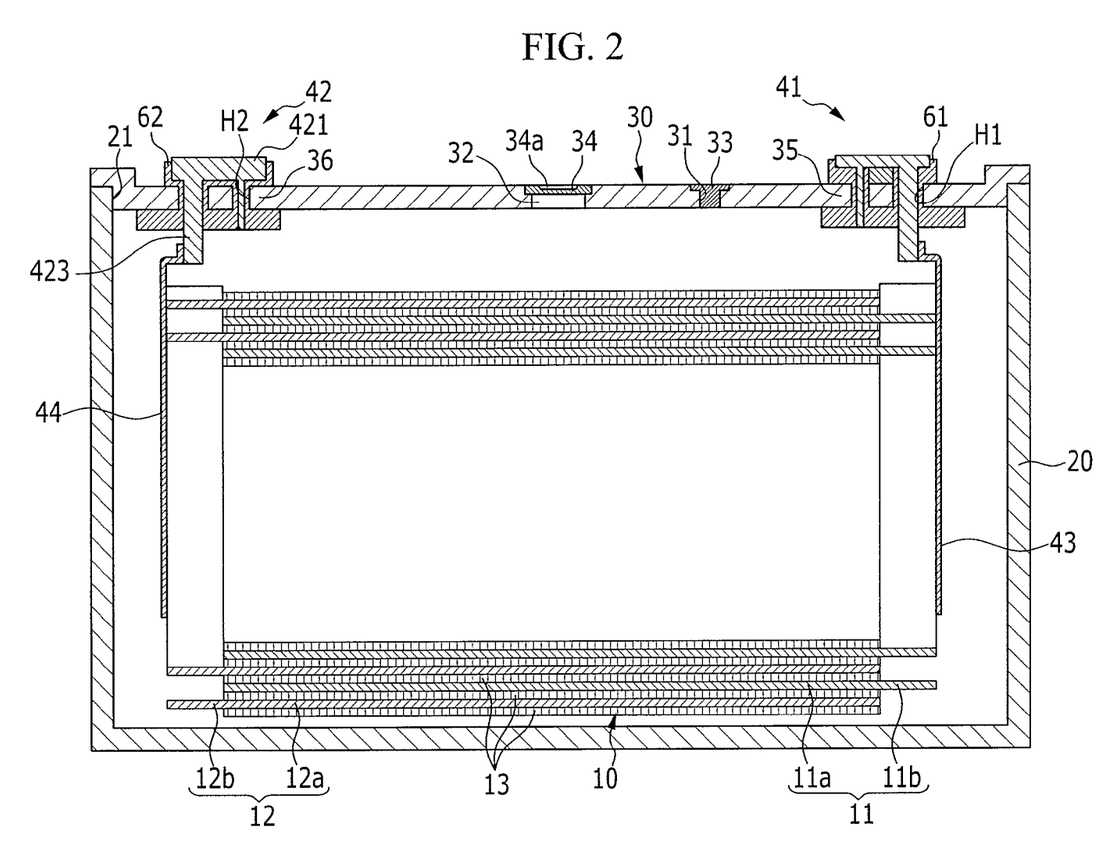
FIG. 2 is a cross-sectional view of the rechargeable battery of FIG. 1, taken along the line II-II.

FIG. 1 is a perspective view of a rechargeable battery according to an exemplary embodiment of the present invention. FIG. 2 is a cross-sectional view of the rechargeable battery of FIG. 1, taken along the line II-II. Referring to FIGS. 1 and 2, a rechargeable battery according to an exemplary embodiment of the present invention includes an electrode assembly 10 that repeatedly performs charging and discharging, a case 20 accommodating the electrode assembly 10 and an electrolyte, a cap plate 30 coupled to an opening 21 of the case 20, and a first electrode terminal 41 and a second electrode terminal 42 that are installed on the cap plate 30.

In one embodiment, the first electrode terminal 41 may be a positive terminal installed on the cap plate 30 and electrically connected with the cap plate 30, and the second electrode terminal 42 may be a negative terminal installed on the cap plate 30 and insulated from the cap plate 30, such that the cap plate 30 and the case 20 are electrically charged into a positive polarity.

The electrode assembly 10 is formed having a first electrode 11 (e.g., a positive electrode) and a second electrode 12 (e.g., a negative electrode) provided on both sides of a separator 13 serving as an electrical insulator, and the first electrode 11, the separator 13, and the second electrode 12 being stacked and wound in a jelly roll form.

In another embodiment, the electrode assembly may be assembled by stacking the first electrode and the second electrode each formed as a single plate, with the separator interposed therebetween, or may be assembled by folding and stacking the first electrode, the separator, and the second electrode in a zigzag pattern (not shown).

The first electrode 11 and the second electrode 12 include respective coated regions 11a and 12a where an active material (not shown) is applied to a current collector, and respective uncoated regions 11b and 12b formed extending from respective ends of the coated regions 11a and 12a as exposed portions of the current collector where the active material is not applied. In one embodiment, for example, the current collector of the first electrode 11 may be formed of an aluminum thin film, and the current collector of the second electrode 12 may be formed of a copper thin film.

In one embodiment, the uncoated region 11b of the first electrode 11 is formed at one end of the first electrode 11 along the coated region 11a of the wound first electrode 11, and the uncoated region 12b of the second electrode 12 is formed at one end of the second electrode 12 along the coated region 12a of the wound second electrode 12. That is, the uncoated regions 11b and 12b are respectively disposed at both ends of the electrode assembly 10 to enable electrical connections between the electrode assembly 10 and the first and second electrode terminals 41 and 42.

The case 20, in one embodiment, has an opening 21 formed at one side, and may have a rectangular parallelepiped shape which facilitates insertion of the electrode assembly 10 through the opening 21 and forms a space for receiving the electrode assembly 10 and the electrolyte.

The cap plate 30 is coupled to the opening 21 of the case 20, thereby sealing the case 20. In one embodiment, for example, the case 20 and the cap plate 30 are formed of aluminum, such that excellent weldability may be attained when the case 20 and the cap plate 30 are welded after coupling with each other due to being formed of the same material.

The cap plate 30, in one embodiment, has an electrolyte injection port 31 and a vent hole 32. The electrolyte injection port 31 may facilitate injection of the electrolyte into the case 20 after coupling the cap plate 30 with the case 20. After injecting the electrolyte, the electrolyte injection port 31 may be sealed with a sealing plug 33.

The vent hole 32 is sealed with a vent plate 34 to discharge internal gas produced by charging and discharging operations out of the rechargeable battery and prevent or substantially prevent explosion of the rechargeable battery. When the internal pressure of the rechargeable battery reaches a pressure (e.g., a predetermined pressure), the vent plate 34 is opened. The vent plate 34 may have a notch 34a that facilitates opening.

The cap plate 30 has through holes H1 and H2 penetrated therethrough to electrically connect the inside and outside of the case 20. The first and second electrode terminals 41 and 42 are respectively installed at the through holes H1 and H2 of the cap plate 30, and are connected to the electrode assembly 10 through respective first and second lead tabs 43 and 44 (e.g., positive and negative lead tabs).

That is, the first electrode terminal 41 is connected to the first electrode 11 of the electrode assembly 10 through the first lead tab 43 having conductivity, and the second electrode terminal 42 is connected to the second electrode 12 of the electrode assembly 10 through the second lead tab 44 having conductivity.

The rechargeable battery further includes first and second insulators 61 and 62 that are interposed between the first and second electrode terminals 41 and 42 and the cap plate 30, which are assembled to each other, and electrically insulate and seal both parts. A coupling structure of the first electrode terminal 41 and the through hole H1 according to an embodiment of the present invention is described below.

Figure 3:
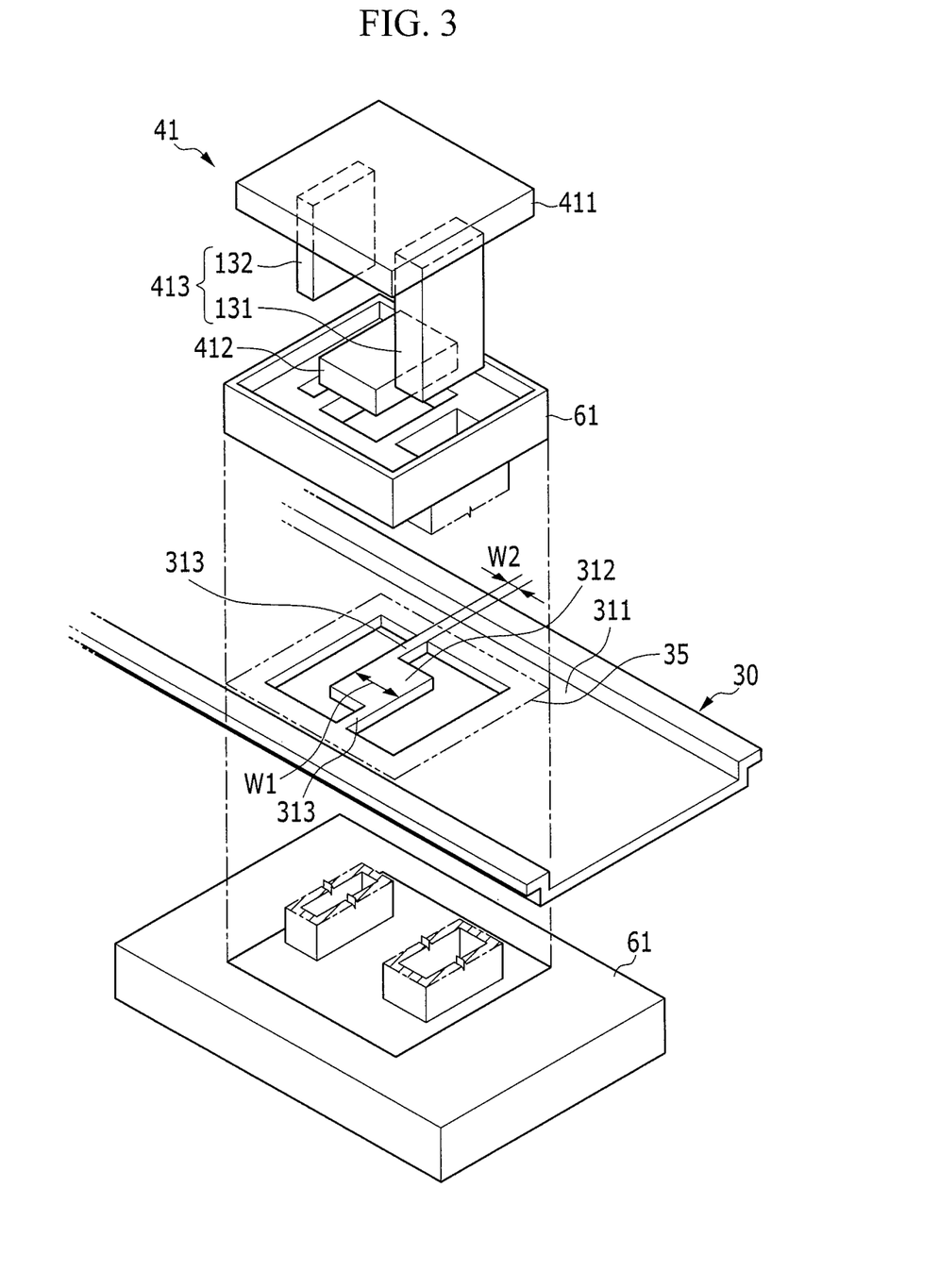
FIG. 3 is an exploded perspective view of an electrode terminal of the rechargeable battery of FIG. 1.
Figure 4:
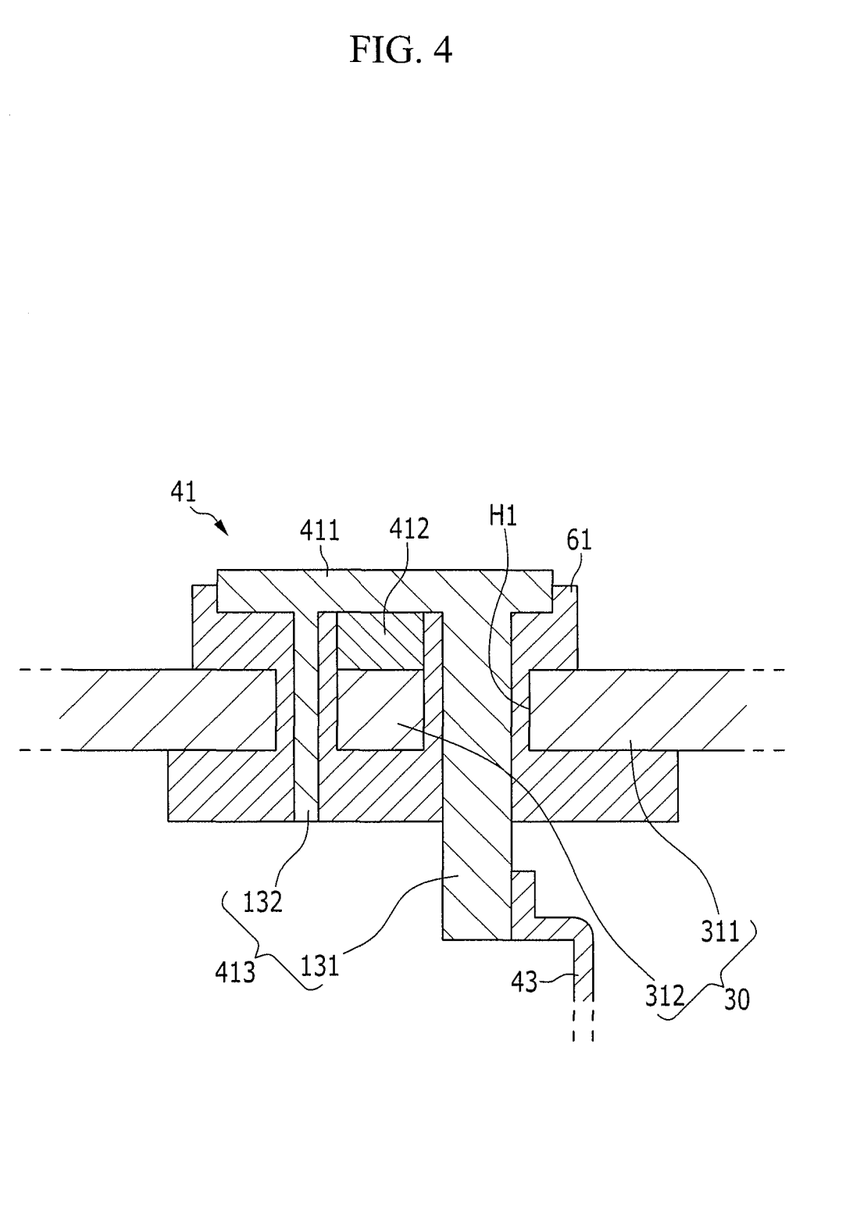
FIG. 4 is a cross-sectional view of the electrode terminal of FIG. 3.

FIG. 3 is an exploded perspective view of an electrode terminal of the rechargeable battery of FIG. 1. FIG. 4 is a cross-sectional view of the electrode terminal of FIG. 3. Referring to FIGS. 3 and 4, the first electrode terminal 41 includes a terminal plate 411 exposed to the outside of the cap plate 30 and insulated from the cap plate 30, a top plate 412 installed between the terminal plate 411 and the cap plate 30 and electrically connecting the terminal plate 411 and the cap plate 30, and a column portion 413 connecting the terminal plate 411 to the first lead tab 43.

The terminal plate 411 and the column portion 413 are electrically insulated from the cap plate 30 by the first insulator 61. The top plate 412 is contained inside the terminal plate 411 and the column portion 413, which are defined by the first insulator 61, and is maintained in contact with a surface of the cap plate 30. For purposes of illustration, the first insulator 61 is illustrated in FIG. 3 as being vertically cut.

The terminal plate 411 is connected with high resistance to the cap plate 30 through the top plate 412. The resistance value with which the terminal plate 411 is connected to the cap plate 30 through the top plate 412 is higher than the resistance value with which the terminal plate 411 is connected to the first lead tab 43 through the column portion 413.

In one embodiment, the cap plate 30 includes a main body portion 311 sealing the opening 21 and corresponding to the opening 21 of the case 20, a contact portion 312 surrounded by the through hole H1 formed by removing a part of the main body portion 311 facing the first electrode terminal 41, and a connecting portion 313 connecting the contact portion 312 and the main body portion 311.

The through hole H1 is formed corresponding to the column portion 413, and facilitates insertion of the column portion 413 and the first insulator 61 corresponding to the column portion 413. As the through hole H1 is formed to surround the contact portion 312, the contact portion 312 is defined inside the through hole H1.

As the contact portion 312 is in contact with the top plate 412, this provides a conductive structure in which the terminal plate 411, the top plate 412, and the contact portion 312 are electrically connected. As the contact portion 312 is connected to the main body portion 311 through the connecting portion 313, the cap plate 30 is connected to the first terminal 41 and electrically charged to a polarity (e.g., a positive polarity) corresponding to a polarity of the first terminal 41.

In one embodiment, the contact portion 312 has an area corresponding to an area of the top plate 412, and forms a conductive structure, together with the top plate 412. The top plate 412 has a higher resistance value than the terminal plate 411. In one embodiment, for example, the cap plate 30 and the terminal plate 411 may be formed of aluminum, and the top plate 412 may be formed of stainless steel having a higher resistance value than aluminum.

Accordingly, when the rechargeable battery is normally driven, current flows from the column portion 413 to the terminal plate 411, and the relatively high resistance value of the top plate 412 may cause the current to be cut off between the terminal plate 411 and the cap plate 30, with the top plate 412 interposed therebetween.

In one embodiment, for example, the contact portion 312 is formed having a rectangular shape corresponding to the top plate 412, and the connecting portion 313 connects a side of the contact portion 312 to the main body portion 311. The connecting portion 313 has a width W2 smaller than a width W1 of the side of the contact portion 312, thus increasing the resistance between the contact portion 312 and the main body portion 311.

The connecting portion 313 may be formed such that it has as high of a resistance as possible so long as the installation structure of the first terminal 41 is maintained on the cap plate 30. In one embodiment, as shown in FIG. 3, the connecting portion 313 may be formed in two parts disposed symmetrically with respect to the contact portion 312.

Accordingly, the connecting portion 313 of the cap plate 30 is configured to further control the amount of high-voltage current flowing from the terminal plate 411 to the top plate 412 and the contact portion 312 by the high resistance of the connecting portion 313 having the relatively small width W2 and the number of the connecting portions 313.

As compared to the area of the contact portion 312, if the area of the connecting portion 313 is large, the first terminal 41 can be stably supported, or if the area of the connecting portion 313 is small, the amount of high-voltage current flowing from the first terminal 41 to the electrode assembly 10 can be further limited upon penetration of the rechargeable battery by a conductive material.

The column portion 413, in one embodiment, includes a first column 131 and a second column 132 that are inserted in the through hole H1 at opposite sides of the top plate 412. The first and second columns 131 and 132 maintain the top plate 412 disposed therebetween, thereby stably fixing the top plate 412 on the contact portion 312 of the cap plate 30, together with the terminal plate 411.

The first column 131 is connected to the first lead tab 43 of the electrode assembly 10, such as by welding. That is, one side of the first lead tab 43 is connected to the first column 131 of the first electrode terminal 41, such as by welding, and the other side of the first lead tab 43 is connected to the uncoated region 11b of the first electrode 11 of the electrode assembly 10. A welding structure of the first column 131 and the first lead tab 43 may reduce a number of parts of the first electrode terminal 41 and simplify the connection to the first lead tab 43.

The first insulator 61, in one embodiment, is formed integrally by insert molding with the first and second columns 131 and 132 disposed at an outer periphery of the top plate 412, the terminal plate 411 covering the top plate 412, and a corresponding portion 35 of the cap plate 30 corresponding to the terminal plate 411.

The first insulator 61 seals the first through hole H1 and the first and second columns 131 and 132, and insulates and seals the terminal plate 411 and the corresponding portion 35. Accordingly, the first insulator 61 requires no gasket, thus making simple the insulation and sealing of the first through hole H1 and the first and second columns 131 and 132.

Figure 5:
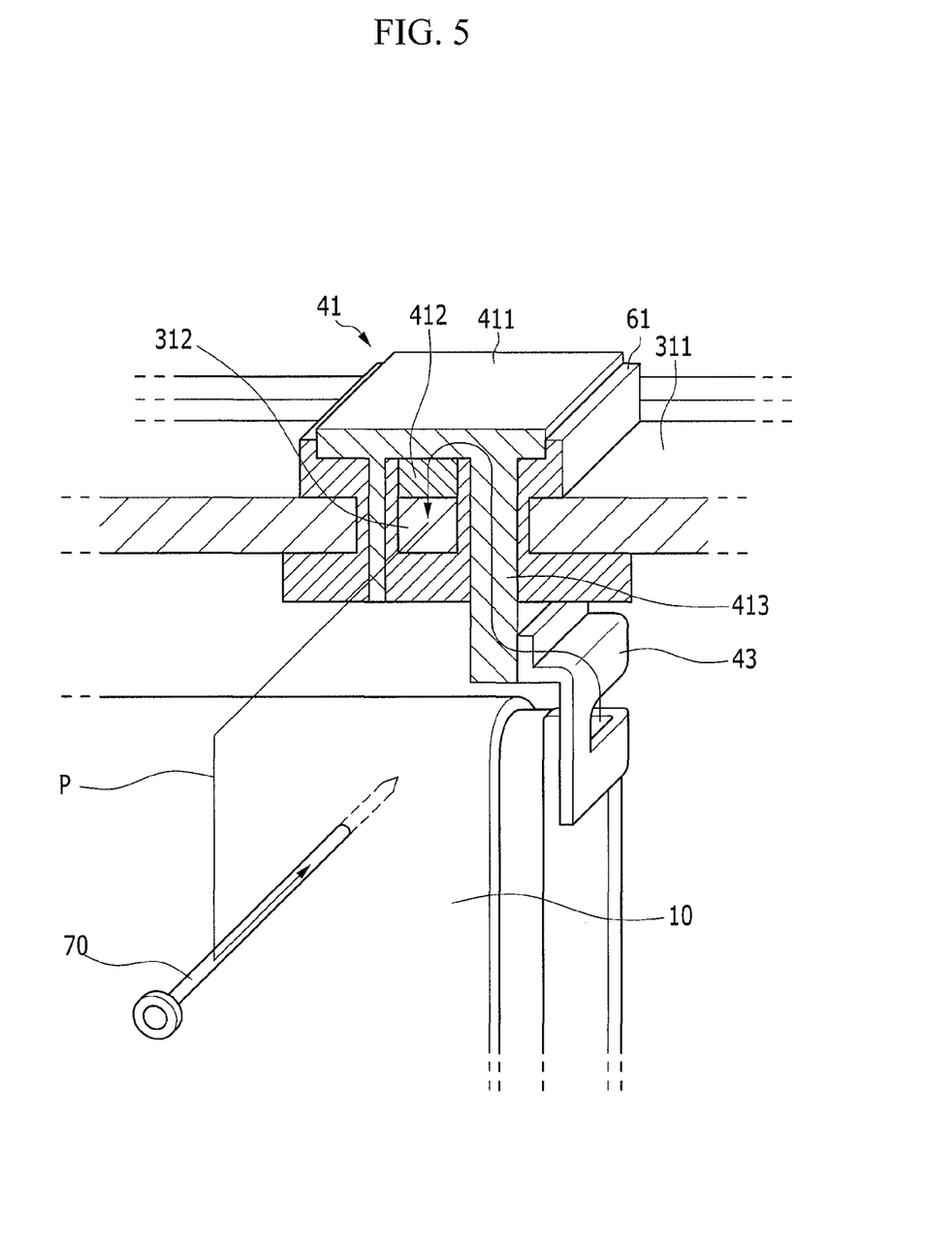
FIG. 5 is a schematic cross-sectional view showing a path P of a current flowing toward a cap plate through an electrode terminal upon penetration of a conductive material in the rechargeable battery of FIG. 1.

FIG. 5 is a schematic cross-sectional view showing a path P of a current flowing toward a cap plate through an electrode terminal upon penetration of a conductive material in the rechargeable battery of FIG. 1.

Referring to FIG. 5, when a conductive material 70 (e.g., a nail) penetrates the rechargeable battery, an amount of high-voltage current flowing along the path P of current toward the electrode assembly 10 through the terminal plate 411, the top plate 412, the contact portion 312, the connecting portion 313, the main body portion 311, the case 20, and the conductive material 70 is reduced by the high resistance of the top plate 412 and the connecting portion 313.

Referring again to FIG. 2, in one embodiment, the second electrode terminal 42 installed on the cap plate 30 includes a terminal plate 421 exposed to the outside of the cap plate 30 and insulated from the cap plate 30, and a column portion 423 connecting the terminal plate 421 to the second lead tab 44.

The terminal plate 421 and the column portion 423 are electrically insulated from the cap plate 30 by the second insulator 62. The column portion 423 is connected to the second lead tab 44 of the electrode assembly 10, such as by welding.

The second insulator 62, in one embodiment, is formed integrally by insert molding with the terminal plate 421, the column portion 423, and a corresponding portion 36 of the cap plate 30 corresponding to the terminal plate 421.

The second insulator 62 seals the through hole H2 and the column portion 423, and insulates and seals the terminal plate 421 and the corresponding portion 36. Since the first and second insulators 61 and 62 may be formed by a single process, the manufacturing process of the rechargeable battery may be simplified.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
    an electrode assembly comprising a first electrode, a second electrode, and a separator between the first electrode and the second electrode;
    a case accommodating the electrode assembly;
    a cap plate covering an opening of the case;
    a first electrode terminal arranged on the cap plate, electrically connected to the cap plate, and connected to the first electrode; and
    a second electrode terminal arranged on the cap plate, insulated from the cap plate, and connected to the second electrode,
    wherein the first electrode terminal comprises:
        a first terminal plate connected to the first electrode and exposed to an outside of the cap plate; and
        a top plate electrically connecting the first terminal plate and the cap plate, and having an electrical resistance greater than an electrical resistance of the first terminal plate, and
    wherein the cap plate comprises:
        a main body portion corresponding to the opening of the case;
        a contact portion facing the first electrode terminal and surrounded by a first through hole formed in the main body portion, the contact portion being in contact with the top plate; and
        a connecting portion connecting the contact portion and the main body portion.

2. The rechargeable battery of claim 1, wherein the contact portion has an area corresponding to an area of the top plate.

3. The rechargeable battery of claim 2, wherein the cap plate and the first terminal plate are formed of aluminum, and the top plate is formed of stainless steel.

4. The rechargeable battery of claim 1, wherein the contact portion has a substantially rectangular shape corresponding to a substantially rectangular shape of the top plate, and the connecting portion connects at least one side of the contact portion and the main body portion.

5. The rechargeable battery of claim 4, wherein the connecting portion has a width smaller than a width of the at least one side of the contact portion.

6. The rechargeable battery of claim 4, wherein the connecting portion comprises two parts arranged symmetrically with respect to the contact portion.

7. The rechargeable battery of claim 1, wherein the first electrode terminal further comprises a column portion connected to the first terminal plate and extending to an inside of the cap plate through first the through hole.

8. The rechargeable battery of claim 7, wherein the column portion comprises a first column and a second column that are inserted in the first through hole at opposite sides of the top plate.

9. The rechargeable battery of claim 8, wherein the first column is connected to a lead tab of the electrode assembly by welding.

10. The rechargeable battery of claim 8, further comprising a first insulator electrically insulating the first electrode terminal and the cap plate,
    wherein the first insulator is formed integrally by insert molding with the first column and the second column disposed at an outer periphery of the top plate, the first terminal plate covering the top plate, and a corresponding portion of the cap plate corresponding to the first terminal plate.

11. The rechargeable battery of claim 1, wherein the second electrode terminal comprises:
    a second terminal plate connected to the second electrode and exposed to the outside of the cap plate; and
    a column portion connected to the second terminal plate and extending to an inside of the cap plate through a second through hole formed in the cap plate,
    wherein the column portion is connected to a lead tab of the electrode assembly.

12. The rechargeable battery of claim 11, further comprising a second insulator electrically insulating the second electrode terminal and the cap plate,
    wherein the second insulator is formed integrally by insert molding with the second terminal plate of the second electrode terminal, the column portion, and a corresponding portion of the cap plate corresponding to the second terminal plate.

* * * * *